(No Model.)

A. H. KENNEDY.
MOTOR VEHICLE.

No. 561,997. Patented June 16, 1896.

Witnesses
Edw. T. Duvall Jr.
E. S. Poole

Inventor
Albert H. Kennedy
By Frankland Jannus
his Attorney

UNITED STATES PATENT OFFICE.

ALBERT H. KENNEDY, OF ROCKPORT, INDIANA.

MOTOR-VEHICLE.

SPECIFICATION forming part of Letters Patent No. 561,997, dated June 16, 1896.

Application filed December 20, 1895. Serial No. 572,788. (No model.)

*To all whom it may concern:*

Be it known that I, ALBERT H. KENNEDY, a citizen of the United States, residing at Rockport, in the county of Spencer and State of Indiana, have invented certain new and useful Improvements in Motor-Vehicles, of which the following is a description, reference being had to the accompanying drawings, and to the letters of reference marked thereon.

My invention relates to improvements in motor-vehicles; and it consists, broadly, in the application, to an ordinary vehicle, of a motor attachment for propelling the vehicle.

According to my invention I provide a motor device in the form of a self-propelling carriage or truck—that is to say, a structure comprising an engine or engines, carrying-wheels therefor, and gear connections between the engines and carrying-wheels for propelling the same along a roadway. This motor is attached to or connected with an ordinary vehicle, so that when the motor is in motion the vehicle will be propelled, the motor taking the place of horses and making a very simple and convenient method of securing the improved results attainable by motor-power, as distinguished from the use of draft-animals.

I prefer to locate the motor in the rear of the vehicle to be propelled, and the vehicle can be steered by a tiller secured to the vertical axis of the front wheels. The supply of fuel may be carried upon the driven vehicle, upon which also is carried the means for starting, stopping, and controlling the motor.

Figure 1:
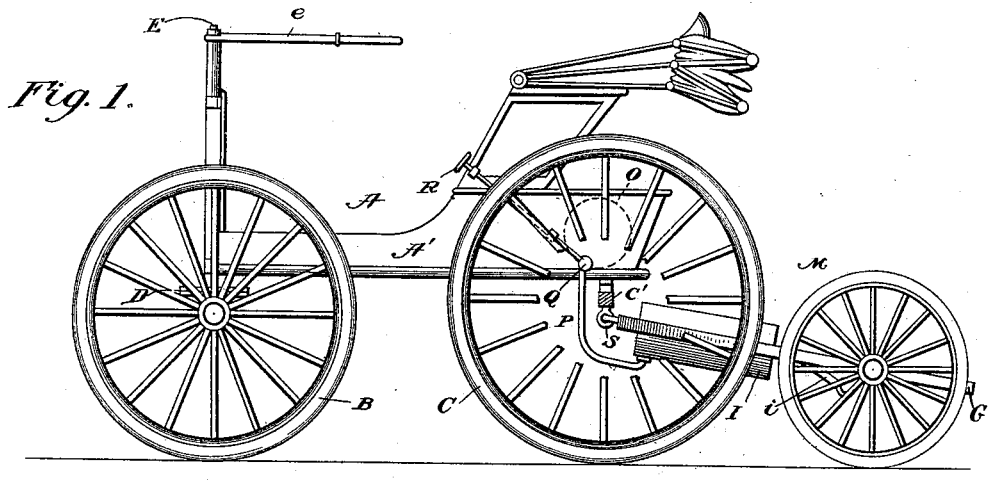
Figure 2:
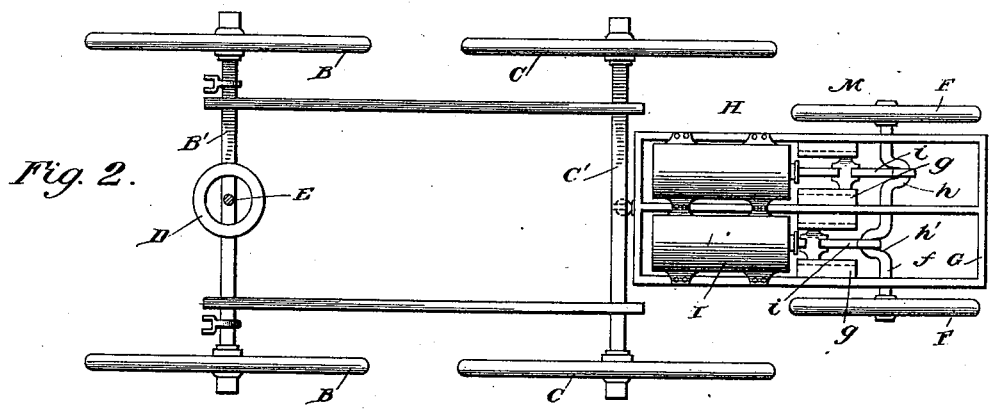
Figure 3:
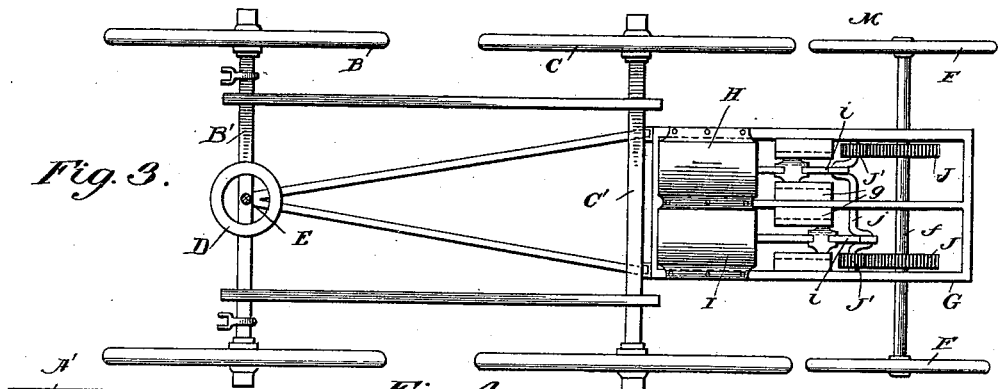
Figure 4:
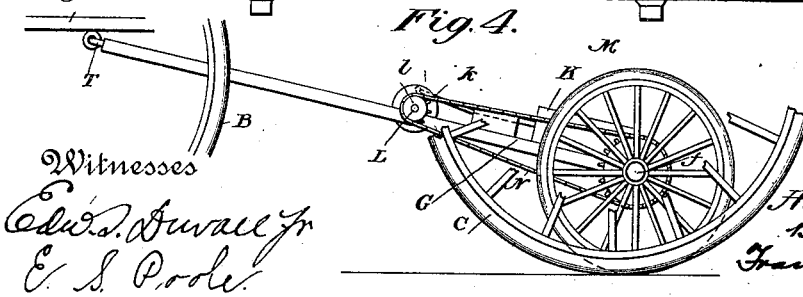

In the accompanying drawings, Figure 1 is a view in elevation showing the vehicle and motor embodying my invention. Fig. 2 is a plan view with the body of the vehicle removed. Fig. 3 is a plan view showing a slightly-different form of motor. Fig. 4 is a detail showing the motor in elevation.

In the drawings, A is the vehicle to be propelled, and A' is the body carrying the seats for passengers or other accommodations. B C are the carrying-wheels thereof.

B' is the front axle, and C' is the rear axle.

The body A is mounted upon the axles in the usual manner, the front axle B' being connected with the body by a fifth-wheel or turn-table D. A steering-post E is secured to the middle of the front axle B' and extends upward and is provided at its upper end with a tiller $e$ within convenient reach of the passengers. The steering-post may be placed farther toward the rear and suitably connected with the front axle B' and be operated by a wheel, if preferred. In other respects the vehicle is of any ordinary type or character, an important object of my invention being to apply motive power to vehicles already in existence, as distinguished from the construction of a special vehicle carrying its own propelling mechanism.

The motor attachment M comprises, as shown, power or driving wheels F, which rest and move along the roadway, as do those of the vehicle. They may be closer together, as indicated in Fig. 2, or they may track with those of the vehicle, as indicated in Fig. 3. The motor-wheels F F are connected by the axle $f$, which is carried in suitable bearings in a frame G.

H I are the cylinders of the propelling-engine, and they are mounted securely in the frame G, their piston-rods being sustained in suitable guides $g$ $g$, also secured in the frame G.

As indicated in Figs. 1 and 2, the shaft of the motor-wheels is provided with a double crank $h$ $h'$, to which the piston-rods are directly connected by connecting-rods $i$ $i$.

As indicated in Fig. 3, the axle $f$ is provided with driving-gears J, and a double crank-shaft $j$ is also suitably journaled in the frame G and provided with driving-pinions J' J'. With this arrangement the connecting-rods $i$ of the engines are connected to the cranks of the shaft $j$, whereby motion is communicated from the engines to the driving-wheels through the pinions J' and driving-gears J at a reduced ratio.

As indicated in Fig. 4, a different type of engine may be employed—for instance, a gas or oil motor engine, the cylinder K of which is mounted upon the frame G, its connecting-rod $k$ engaging a crank upon shaft L, also suitably mounted upon the frame G. With this arrangement the shaft L is provided with a sprocket $l$. Another suitably-proportioned sprocket $m$ is secured upon a driving-shaft $f$, the sprockets being connected by sprocket-chain N. A suitable supply of fuel is carried in a tank O upon the vehicle, connections being made therefrom to the motor through a flexible pipe P, through stop-cock Q, controlled through hand-wheel and rod R, placed within convenient reach.

In some instances the motor M is attached to the rear axle of the vehicle A by a flexible connection S between the front end of the motor-frame G and the rear axle C'. In some instances, however, it is preferable to connect the motor to the front axle of the vehicle, as indicated in Fig. 3, or it may be connected to the under part of the body, near its forward end, as indicated at T in Fig. 4.

I propose to employ any type of engine which may be preferred, whether the same be driven by fluid, such as petroleum or gasolene, or by gas or compressed air, or I may use an electric motor in place of the engines indicated, carrying part or all of the batteries for supplying the current in the body of the vehicle.

As usually constructed, an engine capable of developing sufficient power to propel a vehicle must weigh several hundred pounds, an additional load which would usually be too much for the ordinary lightly-constructed horse-vehicle, although a supply of fuel for such an engine might conveniently be carried therein.

The weight of the engine and its mechanical connections is concentrated in the motor, bringing almost all of its weight upon the driving-wheels F thereof, which will afford them sufficient traction for the purpose of propelling the vehicle, which will ordinarily be lighter than the motor, and by constructing the motor separate from the vehicle I am enabled to dispose the mechanism thereof to the best advantage without regard to the accommodations of the vehicle. Furthermore, it will be apparent that by constructing the motors of different sizes and of different types they can readily be applied to their most suitable work, and in countries where the fuel supply for one class of engine could not readily be obtained a motor of another and more convenient type could be used.

Various modifications will occur to those skilled in the art, and may be made in view of the foregoing without departing from my invention.

What I claim, and desire to secure by Letters Patent, is—

1. In combination, a road-vehicle having a rigid rear axle provided with carrying-wheels, a pivoted front axle provided with carrying-wheels, and a hand steering-gear connected with the front pivoted axle, a separate motor attachment located in the rear of the vehicle, and pivotally connected with a rigid part of the frame thereof, said motor attachment comprising driving-wheels, a supporting-frame therefor, flexible connections between the motor-frame and the frame of the vehicle, an engine on the motor-frame, and mechanical connections between the engine and the driving-wheels of the motor.

2. The combination with an ordinary road-vehicle having front and rear wheels, and a hand steering-gear connected with the front wheels, of a separate motor attachment located in the rear of the vehicle and pivotally connected with the frame thereof, said motor attachment comprising driving-wheels, a supporting-frame therefor, flexible connections between the motor-frame and the frame of the vehicle, an engine on the motor-frame, mechanical connections between the engine and the driving-wheels of the motor, a fuel-supply tank on the vehicle and connections between said tank and the engine of the motor.

In testimony whereof I hereto affix my signature in presence of two witnesses.

ALBERT H. KENNEDY.

Witnesses:
ELBERT M. SWAN,
E. E. WESSELER.